United States Patent [19]

Kanda et al.

[11] Patent Number: 4,982,394
[45] Date of Patent: Jan. 1, 1991

[54] OPTICAL INFORMATION RECORDING/REPRODUCING APPARATUS

[75] Inventors: Shigeto Kanda, Machida; Hiroto Kitai, Tokyo; Etsuo Yamada, Sagamihara, all of Japan

[73] Assignee: Canon Kabushiki Kaisha, Tokyo, Japan

[21] Appl. No.: 224,758

[22] Filed: Jul. 27, 1988

[30] Foreign Application Priority Data

Aug. 4, 1987 [JP] Japan .................................. 62-193664

[51] Int. Cl.$^5$ ................................................. G11B 7/00
[52] U.S. Cl. ..................... 369/44.32; 369/54
[58] Field of Search ................. 358/342; 369/43–47, 369/32, 53–58; 250/201 DF; 360/77.01, 77.02

[56] References Cited

U.S. PATENT DOCUMENTS

| 4,340,950 | 7/1982 | Kosaka | 369/44 |
| 4,414,655 | 11/1983 | Shoji et al. | 369/44 |
| 4,692,915 | 9/1987 | Moriya et al. | 369/53 |

FOREIGN PATENT DOCUMENTS

| 0217460 | 4/1987 | European Pat. Off. . |
| 22447 | 1/1986 | Japan . |
| 36745 | 2/1987 | Japan . |
| 36746 | 2/1987 | Japan . |

Primary Examiner—Robert L. Richardson
Attorney, Agent, or Firm—Fitzpatrick, Cella, Harper & Scinto

[57] ABSTRACT

An optical information processing apparatus comprises an optical head having an optical system contained in a frame and effecting at least one of recording and reproduction of information by applying a light beam condensed by the optical system to a recording medium, a detector for detecting at least one of a tracking signal and a focusing signal, a controller for moving at least a portion of the optical system in accordance with at least one of the tracking signal and the focusing signal, a detector for detecting the postion of the moving portion of the optical system relative to the frame, a position controller for controlling the moving portion so as to be held in a predetermined position, on the basis of the output signal of the position detecting detector, a detector for detecting the abnormality of at least one of the tracking and focusing controls, and a switching device for alternatively operating the tracking and focusing controller and the position controller and rendering the tracking and focusing controller inoperative and operating the position controller when the abnormality of the tracking or focusing control is detected.

12 Claims, 4 Drawing Sheets

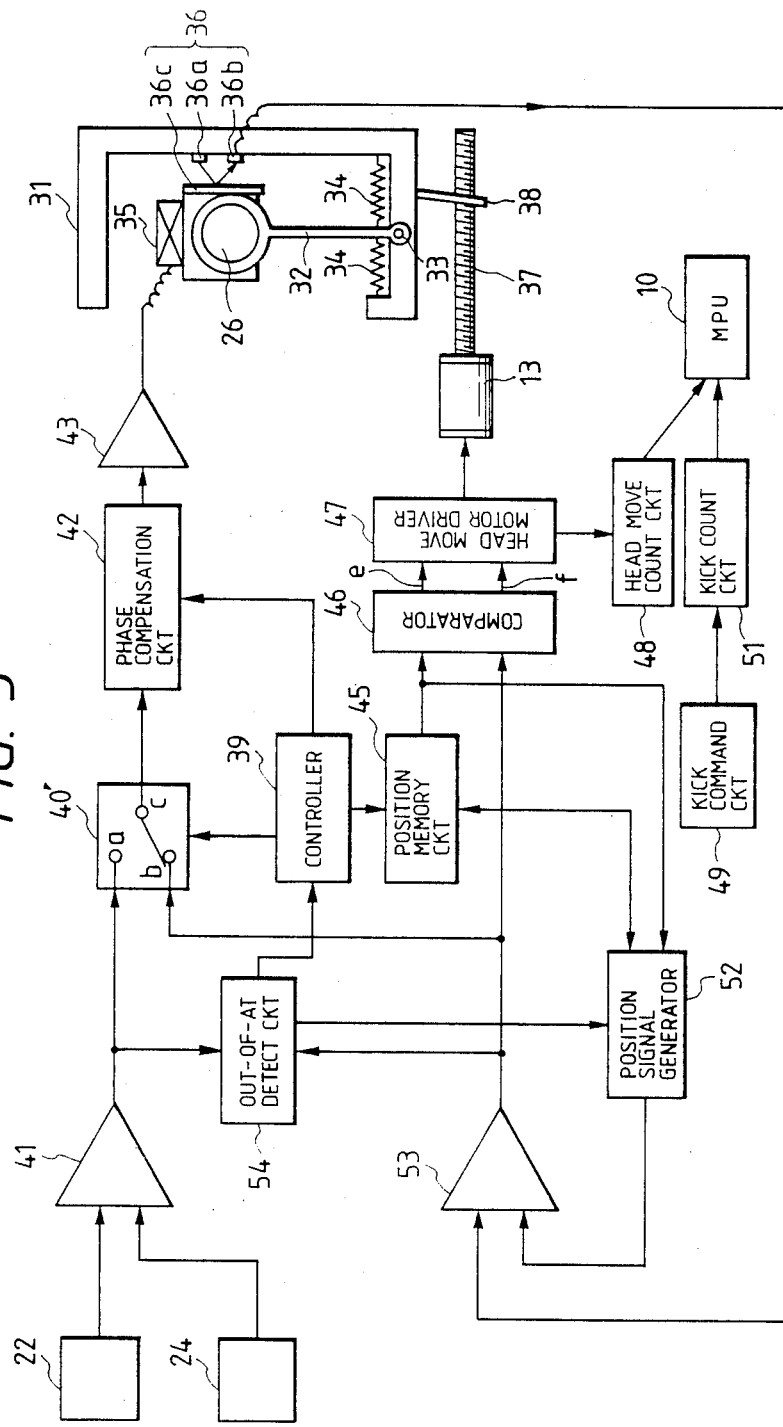

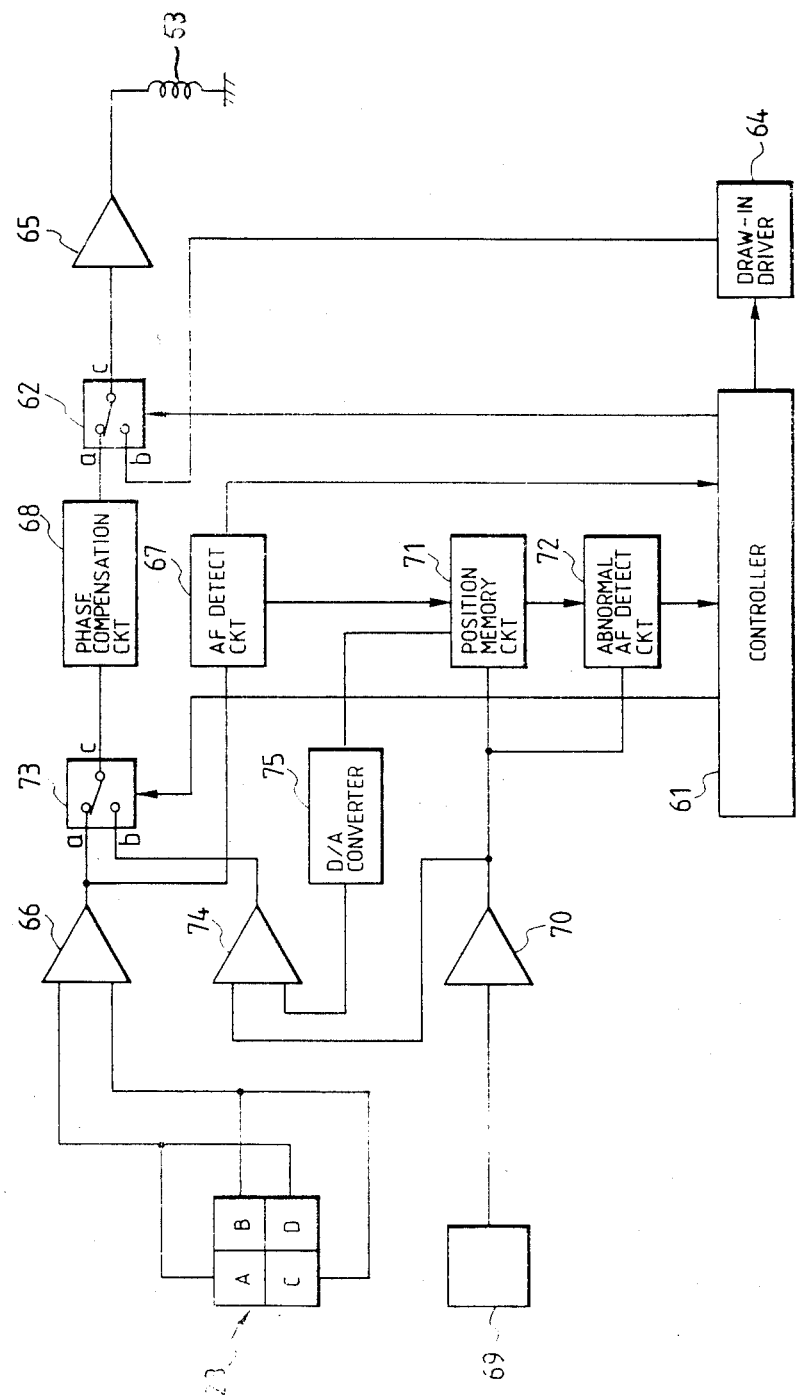

OPTICAL INFORMATION RECORDING/REPRODUCING APPARATUS

BACKGROUND OF THE INVENTION

1. Field of the Invention

This invention relates to an apparatus for effecting at least one of recording and reproduction of information by applying a light beam to a recording medium, and in particular to an optical information processing apparatus provided with means for effecting the tracking or focusing control of the light beam and means for detecting the abnormality of said control.

2. Related Background Art

Various shapes such as a disc-like shape, a card-like shape and a tape-like shape are known as the forms of a medium on which a light is used to record information and read the recorded information. These optical information recording mediums include ones which are capable of recording and reproduction and ones which are capable of only reproduction.

Recording of information on a medium capable of recording is accomplished by scanning information tracks by a light beam modulated in accordance with recording information and stopped down into a minute spot-like shape, and information is recorded as an optically detectable information bit row.

Also, reproduction of information from a recording medium is accomplished by scanning the information bit row of an information track by a light beam spot of such a degree of predetermined power that recording is not effected on the medium, and detecting the light reflected from or transmitted through the medium.

In an apparatus for information recording onto the recording medium as described above and information reproduction from such recording medium, a so-called optical head is used for the application of a light beam spot to the recording medium and for the detection of the light reflected from or transmitted through the medium. The optical head is movable relative to the recording medium in the information track direction thereof and in a direction transverse to said track direction, and the scanning of the information tracks by the light beam spot is accomplished by said relative movement. Also, in the optical head, a portion of an optical system, for example, an objective lens, is held for independent movement relative to the optical head body in the direction of the optic axis thereof (the focusing direction and in a direction orthogonal to both the direction of the optic axis and the information track direction of the recording medium (the tracking direction). Holding of the objective lens is generally accomplished through a resilient member, and the movements of the objective lens in said two directions are generally driven by an actuator utilizing an electromagnetic interaction.

Among the optical information recording mediums as described above the card-like optical information recording medium (hereinafter referred to as the "optical card") has a great estimated demand as an information recording medium of relatively great capacity which is compact and light in weight and convenient for carrying.

FIG. 1 of the accompanying drawings is a schematic plan view of a postscript type optical card, and FIG. 2 of the accompanying drawings is a fragmentary enlarged view thereof.

In FIG. 1, a number of parallel information tracks 4 extending in a direction LF are arranged on the information recording surface of the optical card 1. Also, a home position 3 which provides the reference position for the access to the information tracks 4 is provided on the information recording surface of the optical card 1. The information tracks 4 are arranged in the order of 4-1, 4-2, 4-3, . . . in succession from the home position 3. The information tracks 4 include two kinds of tracks, i.e., tracks on which information is already recorded and tracks on which information is not yet recorded. Information can be recorded at any time on the information tracks on which information is not yet recorded.

As shown in FIG. 2, tracking tracks 5 (for example, 5-1, 5-2, 5-3) are provided between adjacent tracks 4 (for example, 4-1 and 4-2). These tracking tracks are utilized as a guide for auto tracking (AT) which controls a light beam spot so as not to deviate from a predetermined information track when it scans during the information recording and reproduction. This AT servo is accomplished by detecting the deviation of the light beam spot from an information track 4 (an AT error) in an optical head, negatively feeding back the detection signal to the tracking actuator, moving an objective lens relative to the optical head body in the tracking direction and causing the light beam spot to follow a desired information track.

Now, if there is a great defect on the medium or a shock is applied to the apparatus when information is recorded or reproduced as described above, there may occur out-of-AT servo. In such case, usually, the AT servo loop is once opened and after the defect or the like has been passed, the AT servo is again drawn in. In this method, however, the position of the objective lens while the servo loop remains opened cannot be known, and this has led to the problem that during the re-draw-in, much time is required for the beam spot to return to the initial track in which the out-of-AT servo has occurred. Also, no drive force is applied to the objective lens while the servo loop remains opened and therefore, there has been the danger that due to vibration, the objective lens collides against the frame of the optical head and is damaged thereby.

On the other hand, in Japanese Laid-Open Patent Application No. 59-142757 (laid open on Aug. 16, 1984), there is proposed a method of detecting the defect of said medium and holding a tracking signal. However, again in this method, if positional deviation occurs during the holding, re-draw of AT into the initial track does not always takes place after the holding is released. Accordingly, in some cases, much time has also been required before the beam spot returns to the initial track.

Also, the problem of out-of-servo as described above has arisen not only in AT servo, but also in auto focusing (AF) servo for accurately focusing the light beam onto the medium surface.

SUMMARY OF THE INVENTION

It is the object of the present invention to solve the above-noted problems peculiar to the prior art and to provide an optical information processing apparatus in which when out-of-AT or AF servo occurs, re-draw-in of the servo can be accomplished accurately and quickly.

The above object of the present invention is achieved by an optical information processing apparatus comprising an optical head having an optical system contained in a frame and effecting at least one of recording and reproduction of information by applying a light beam condensed by said optical system to a recording medium, means for detecting a tracking signal and/or a focusing signal, tracking and/or focusing control means for moving at least a portion of said optical system in accordance with said tracking signal and/or said focusing signal, means for detecting the position of the moving portion of said optical system relative to said frame, position control means for controlling said moving portion so as to be held in a predetermined position, on the basis of the output signal of said position detecting means, means for detecting the abnormality of said tracking and/or focusing control, and switching means for alternatively operating said tracking and/or focusing control means and said position control means and rendering said tracking and/or focusing control means inoperative and operating said position control means when the abnormality of said tracking and/or focusing control is detected.

BRIEF DESCRIPTION OF THE DRAWINGS

FIG. 5 is a block diagram showing the details of an AT servo circuit in the apparatus shown in FIG. 3.

FIG. 7 is a block diagram showing the details of an AF servo circuit in the apparatus shown in FIG. 3.

DESCRIPTION OF THE PREFERRED EMBODIMENTS

The present invention will hereinafter be described in detail with respect to an information recording-reproducing apparatus using an optical card with reference to the drawings.

Figure 3:
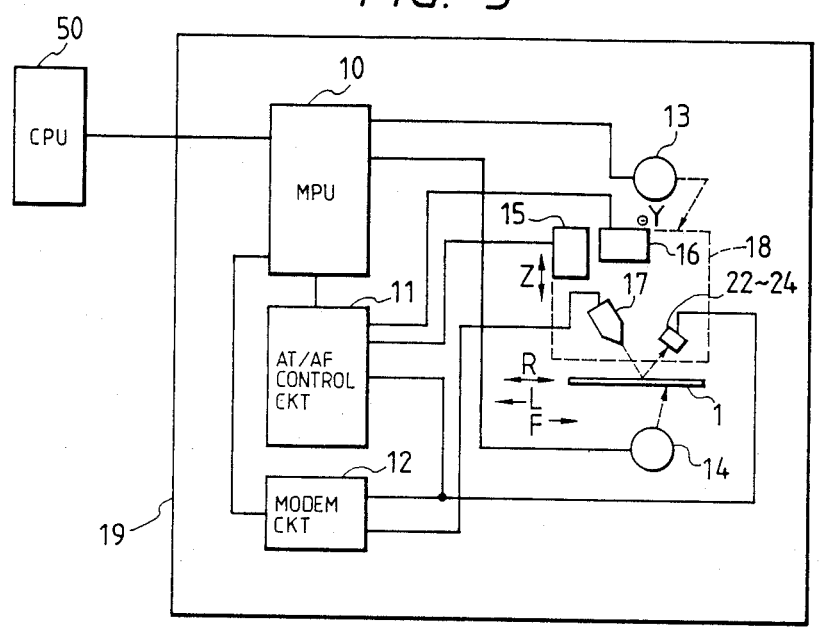
FIG. 3 is a schematic diagram showing the general construction of an embodiment of the optical information processing apparatus of the present invention.

FIG. 3 is a block diagram schematically showing the construction of an embodiment of an information processing apparatus according to the present invention.

In FIG. 3, the reference numeral 19 designates a recording-reproducing apparatus to which is connected a central processing unit (CPU) 50 which is a high rank control device. In the recording-reproducing apparatus 19, the reference numeral 14 denotes a drive motor for introducing an optical card 1 into the recording-reproducing apparatus through a conveying mechanism, not shown, reciprocally moving it at a predetermined recording-reproducing position in the direction of arrow R and further discharging it out of the apparatus.

The reference numeral 17 designates a light beam applying optical system including a light source by which light beam spots are formed on the optical card 1 which is an optical information recording medium during information recording and during information reproduction. In the present embodiment, during recording and reproduction, three light beam spots are formed on the optical card 1. The reference numerals 22-24 denote photodetectors which can receive the reflected lights of said three light beam spots on the optical card 1. The reference numeral 15 designates an AF actuator for driving an objective lens which is a part of the light beam applying optical system 17 to thereby move the focused positions of the light beam spots on the optical card surface in Z direction, i.e., a direction perpendicular to the optical card surface, and accomplish AF servo, and the reference numeral 16 denotes an AT actuator for driving the objective lens which is a part of the light beam applying optical system 17 to thereby move the light beam spots on the optical card surface in Y direction (i.e., a direction orthogonal to both R direction and Z direction) and accomplish AT servo.

An optical head 18 is constituted including the light beam applying optical system 17, the photodetectors 22-24, the AF actuator 15 and the AT actuator 16. The reference numeral 13 designates a drive motor for moving the optical head in Y direction and accessing the light beam spots to a desired track on the optical card.

The drive motor 13 and the drive motor 14 are controlled by a micro processing unit (MPU) 10. The outputs of the photodetectors 22-24 are input to a control circuit 11, and on the basis thereof, the control circuit controls the AF actuator 15 and the AT actuator 16 to thereby accomplish AF servo and AT servo. Also, the outputs of the photodetectors 22-24 are input to a modemodulating circuit 12, whereby demodulation of the read information is effected, and the demodulated signal is supplied to the MPU 10. Also, the modemodulating circuit 12 modulates the information signal supplied from the MPU 10, and drives the light beam applying optical system 17 in accordance with the modulated signal to thereby accomplish information recording.

The MPU 10 is controlled by the CPU 50 and effects exchange of data with the CPU.

Figure 4:
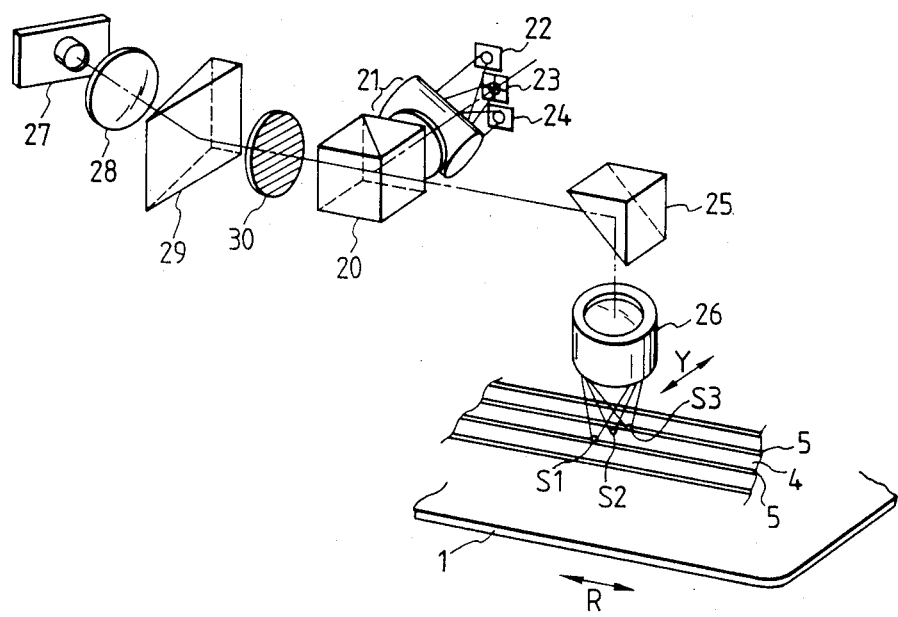
FIG. 4 is a perspective view showing the details of an optical head portion in the apparatus shown in FIG. 3.

FIG. 4 is a perspective view showing the details of the optical head portion of FIG. 3.

In FIG. 4, the reference numeral 27 designates a semiconductor laser which is a light source, the reference numeral 28 denotes a collimator lens, the reference numeral 29 designates a light beam shaping prism, the reference numeral 30 denotes a diffraction grating for dividing a light beam, the reference numeral 20 designates a beam splitter, the reference numeral 25 denotes a reflecting prism, the reference numeral 26 designates an objective lens, the reference numeral 21 denotes an astigmatic condensing lens system, and the reference numerals 22-24 designate said photodetectors.

A light beam emitted from the semiconductor laser 27 enters the collimator lens 28 as a divergent light beam and is made into a parallel light beam by this lens. The parallel light beam is shaped into a predetermined light intensity distribution by the light beam shaping prism, and then enters the diffraction grating 30, by which it is divided into three effective light beams (0-order diffracted light and ±1st-order diffracted lights). These three light beams then enter the beam splitter 20 and are rectilinearly transmitted therethrough, and further are reflected by the reflecting prism 25 and enter the objective lens 26 and pass therethrough and are converged thereby, and form three minute light beam spots S1 (corresponding to the ±1st-order diffracted light), S2 (corresponding to the 0-order diffracted light) and S3 (corresponding to the −l1st-order diffracted light) on the optical card 1. A number of parallel information tracks 4 extending in R direction are arranged on the optical card 1, and tracking tracks 5 available as a guide for the tracking in the case of the scanning of the light beam spots during information recording and reproduction are disposed between the adjacent information tracks.

The light beam spots S1 and S3 lie on the adjacent tracking tracks 5 and the light beam spot S2 lies on the information track 4 between said tracking tracks. Thus, the reflected lights from the light beam spots formed on the optical card pass through the objective lens 26 and are thereby made substantially parallel, and are reflected by the reflecting prism 25, and the further reflected by the beam splitter 20 and are converged by the condensing lens system 21, and enter the photodetectors 22, 23 and 24.

The basic construction of such an optical card recording-reproducing apparatus is described, for example, in U.S. application Ser. No. 33,789 (field on Apr. 3, 1987).

FIG. 5 is a block diagram schematically showing the AT servo circuit of the FIG. 3 apparatus which is a feature of the present invention. In FIG. 5, members identical to those in FIGS. 3 and 4 are given identical reference numerals.

In FIG. 5, the reference numeral 31 designates the frame of the optical head. On this frame, the objective lens 26 which is a part of the optical head optical system is supported for pivotal movement about a fulcrum 33 by a support member 32. On the other hand, the support member 32 and the frame 31 are connected together through a spring 34, whereby they are held in the neutral position shown. An AT coil 35 is mounted on the objective lens support member 32, and this coil, with an unshown permanent magnet mounted on the frame 31, constitute an AT actuator.

The optical head is provided with a position detector 36 for detecting the position of the objective lens 26 in the tracking direction relative to the frame 31. This detector comprises, for example, a light-emitting element (for example, a light-emitting diode) 36a and a light-receiving element (for example, a photo-transistor) 36b mounted on the frame 31 and a reflecting plate 36c mounted on the objective lens support member 32, and can detect the position of the objective lens in the tracking direction (Y direction) with the quantity of light when the light beam emitted from the light-emitting element 36a enters the light-receiving element 36b after it has been reflected by the reflecting plate 36c.

The frame 31 is movable in the tracking direction. The reference numeral 13 designates a drive motor for moving the frame. The output shaft of the drive motor 13 is connected to a screw shaft 37. A pin member 38 projectedly provided on the frame 31 is in meshing engagement with the screw shaft 37, and the optical head can be driven in the tracking direction by revolution of the motor 13.

In the present embodiment, tracking is accomplished in the following manner.

First, a control signal is supplied from a control circuit 39 to a change-over switch 40' to close the switch at b-c. In this condition, the AT servo loop is not closed and therefore, no current flows to the AT coil 35 and the objective lens 26 is positioned in its neutral position.

Subsequently, a position signal for moving the objective lens 26 in the tracking direction is output from a position signal generating circuit 52. That is, the output of the position signal generating circuit 52, with the output signal of the objective lens position detector 36, is input to a differential amplifier 53, the output of which is connected to the input terminal b of the change-over switch 40', and since the position control loop is closed, a monotonously increasing voltage signal is output, for example, from the position signal generating circuit 52, whereby the objective lens 26 can be moved in the tracking direction relative to the optical head body 31. Accordingly, this voltage signal is a signal corresponding to the position of the objective lens 26 in the tracking direction when the objective lens position control loop is closed. At this time, the reflected lights from the light beam spots formed on the optical card surface are detected by the AT photodetectors 22 and 24 in the optical head and the detection signals monitor an AT error signal formed through a differential amplifier 41, and at a point of time whereat AT servo draw-in has become possible, a control signal is output from the control circuit 39 to thereby close the switch 40' at a-c. Thus, the tracking error signal is negatively fed back to the AT coil 35 via a phase compensation circuit 42 and an AT coil driver 43, whereby AT servo draw-in is effected.

At a point of time whereat AT servo draw-in has been effected in the manner described above, the position signal output from the position signal generating circuit 52 is stored in a position memory circuit 45. As described above, this position signal corresponds to the position of the objective lens at the point of time whereat AT servo draw-in has been effected. Thereafter, a signal corresponding to the neutral position of the objective lens 26 is output from the position signal generating circuit 52, whereby the output signal of the differential amplifier 53 becomes a position signal corresponding to the position of the objective lens, and this position signal is input to a comparator 46. After said AT servo draw-in, said position signal is compared by the comparator 46 with the position signal during the AT servo draw-in which is stored in the position memory circuit 45. When the difference between the current position signal and the position signal during the AT draw-in exceeds a present value on the basis of the skew of the information tracks and the vibration from the outside, a move timing signal e and a direction signal f are output to an optical head move motor driver 47 and thus, the screw shaft 37 is rotated by the drive motor 13 and the optical head is moved by a suitable distance toward a desired quarter in the tracking direction.

The then amount of move of the motor 13 by the motor driver 47 is counted in an optical head move count circuit 48 with the track pitch as a unit (i.e., as the number of transverse tracks) and the count value from the time of said AT servo draw-in is stored therein.

Also, when after the AT servo draw-in, a kick operation of moving the objective lens 26 in the tracking direction relative to the frame 31 and moving the light beam spots to the adjacent information tracks has been performed by unshown means, the frequency of kick is input from a kick command circuit 49 to a kick count circuit 51 and is counted by the latter circuit. Also, when on the basis of the kick operation, the difference between the detected position signal and the position signal during the AT draw-in exceeds said preset value, movement of the optical head and the optical head move count accompanying it are effected in the same manner as that described above.

In the present embodiment, after the AT servo draw-in, an AT error signal is monitored in an out-of-AT servo detect circuit 54 and if there is out-of-AT servo, a servo change-over signal is output at that point of time, and on the basis thereof, the change-over switch 40' is closed at b-c and at the same time, the compensation of the phase compensation circuit 42 is changed over. Simultaneously therewith, a signal for causing the signal of the objective lens position during the AT servo draw-in which is stored in the position memory circuit 45 to be output is output from the out-of-AT servo detect circuit 54 to the position signal generating circuit 52. Thus, by the position control loop, the objective lens 26 is moved to the objective lens position during said AT servo draw-in. The position to which the then objective lens 26 is moved need not be the position during the AT servo draw-in, but may be other position, for example, the neutral position or the like.

The respective count values are introduced from the optical head move count circuit 48 and the kick count circuit 51 into the MPU 10, and the frame 31 is moved in the tracking direction by the drive motor 13 by a suitable distance calculated by the use of these values and the desired track position.

Finally, a control signal is supplied from the control circuit 39 to the change-over switch 40' to close this switch at a-c, thereby accomplishing AT servo re-draw-in.

The out-of-AT servo can be detected by any one of various methods. For example, there is a method of calculating the speed of movement of the objective lens 26 from the output signal of the position detector 36, and comparing the calculated value with a predetermined value. Here, when the calculated value is greater than the predetermined value, it is judged that there has been an abnormal movement of the objective lens, and this is determined as out-of-AT servo.

Figure 1:
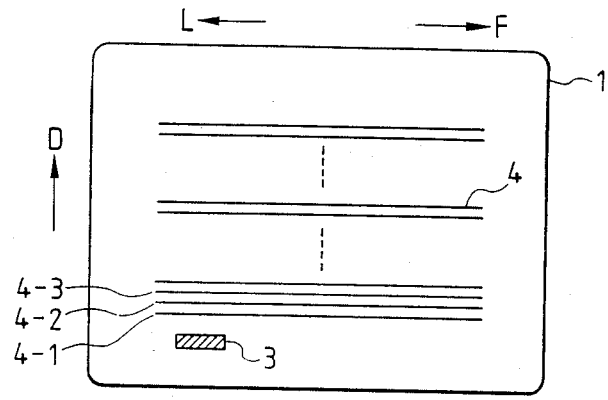
FIG. 1 is a schematic plan view showing an example of the optical card according to the prior art.
Figure 2:
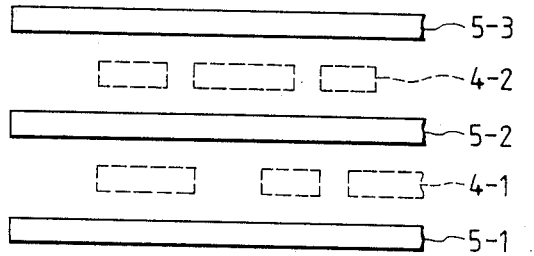
FIG. 2 is a fragmentary enlarged plan view of the recording surface of the optical card shown in FIG. 1.
Figure 6:
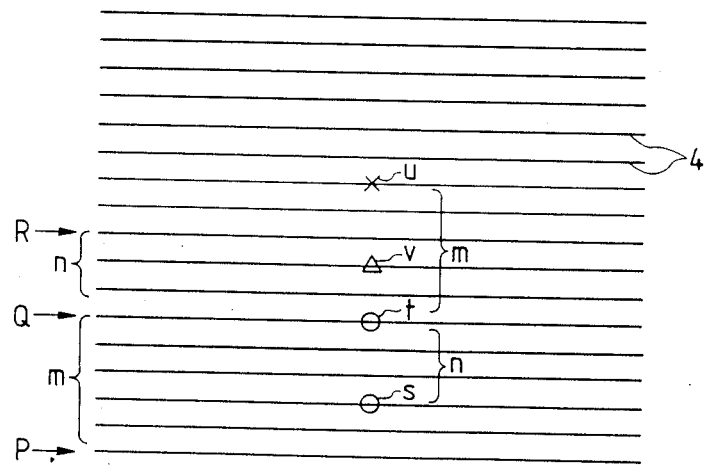
FIG. 6 is a schematic plan view showing the manner of movement of a light beam spot on an optical card during the re-draw-in after the out-of-AT servo based on the present invention.

FIG. 6 illustrates the movement of the light beam spot on the optical card during the re-draw-in after the out-of-AT servo as described above in the present embodiment. In FIG. 6, the reference numeral 4 designates information tracks.

In the optical head arrangement during the first AT servo draw-in, let it be assumed that the neutral position of the objective lens is P. Let it also be assumed that the track into which the AT servo has been actually drawn is s. In this case, the objective lens position stored in the position memory circuit 45 is s with said P as the reference (in the case of FIG. 6, two tracks).

Next, assuming that the kick operation has been effected by an amount corresponding to n tracks, the light beam spot moves to a track t. In the meantime, the optical head move drive motor 13 does not operates and the neutral position of the objective lens remains at P. Further, the kick operation is effected by an amount corresponding to m tracks, and the light beam spot moves to a track n. In the meantime, the optical head move drive motor 13 is operated and the optical head is moved as a whole by an amount corresponding to m tracks. Thus, the neutral position of the objective lens becomes Q.

Let it be assumed that out-of-AT servo has been detected when the light beam spot lies on the track u. In this case, to draw the AT servo into the track u again, change-over from the AT servo to the position servo is first effected, and then the objective lens is moved to the position during the first AT servo draw-in relative to the optical head body. Thus, the light beam spot moves to a track v. In the meantime, the optical head is not moved and therefore, the neutral position of the objective lens remains at Q. Subsequently, the optical head move drive motor 13 is operated and the optical head is moved as a whole by an amount corresponding to n tracks, and at this point of time, the AT servo draw-in is effected and the AT servo re-draw-in is effected to the track u.

As can be seen from the foregoing description, in the present embodiment, the optical head is suitably moved with the objective lens being held at a desired position and the AT servo re-draw-in is effected and therefore, accurate and quick AT servo draw-in to a desired track becomes possible.

While the present invention has been described with respect to the AT servo, the present invention is also applicable to the AF servo. This will hereinafter be described.

FIG. 7 is a block diagram schematically showing the AF servo circuit of the apparatus shown in FIG. 3. In FIG. 7, members identical to those in FIGS. 3 and 4 are given identical reference numerals.

In the present embodiment, focusing is done in the following manner.

First, a control signal is supplied from a control circuit 61 to a change-over switch 62 to close this switch at b-c. In this condition, the AF servo loop is not closed and therefore, no current flows to an AF coil 63 and the objective lens is in its neutral position. Also, a control signal is supplied from the control circuit 61 to a change-over switch 73 to close this switch at a-c.

Subsequently, an operation command signal is supplied from the control circuit 61 to an AF draw-in driver circuit 64, from which a signal for applying to the AF coil a driving current which will move the objective lens greatly in the focusing direction is supplied to an AF coil driver 65 via the change-over switch 62. At this time, the reflected light from the light beam spot formed on the optical card surface is detected by an AF photodetector (four-division photodetector) 23 in the optical head and this detection signal monitors an AF error signal formed via a differential amplifier 66, by an AF detect circuit 67. This AF detect circuit outputs a signal at an exact point of time of in-focus, and on the basis of the signal from this circuit, a control signal is output from the control circuit 61 to close the change-over switch 62 at a-c. Thus, the AF error signal output from the differential amplifier 66 is negatively fed back to the AF coil 63 via the change-over switch 73, the phase compensation circuit 68, the change-over switch 62 and the AF coil driver 65, whereby AF servo draw-in is effected.

At the point of time whereat the AF servo draw-in has been effected in the manner described above, a detected position signal output from a detector 69 for detecting the position of the objective lens in the focusing direction which is similar in construction, for example, to the aforementioned position detector 36 is amplified by an amplifier 70 and stored in a position memory circuit 71. This position signal is also input to a differential amplifier 74. From the position memory circuit 71, the stored position signal is input to the differential amplifier 74 via a D/A converter 75. The output of this differential amplifier is connected to the input terminal b of the change-over switch 73.

In the present embodiment, after the AF servo draw-in, the detection of abnormal AF by the comparison with the position signal during the AF servo draw-in stored in the position memory circuit 71 is effected in the abnormal AF detect circuit 72. If on the basis of the vibration or the like from the outside, the difference between the detected position signal and the position signal during the AF draw-in exceeds a preset AF servo operable range, an abnormal AF detection signal is supplied to the control circuit 61.

When out-of-AF is thus detected by the abnormal AF detect circuit 72, a control signal is output from the control circuit 61 to close the change-over switch 73 at b-c. Thereby, an AF servo off condition is brought about, and the position servo based on the current position of the objective lens detected by the objective lens position detector 69 and the position of the objective lens during the AF servo draw-in stored in the position memory circuit 71 is effected. In this position servo, the position stored in the position memory circuit 71 is regarded as the target value.

Thus, by the position servo, the objective lens is moved to the objective lens position during said AF servo draw-in. The position to which the then objective lens is moved need not be the position during the AF servo draw-in, but may be other suitable position stored in advance in the position memory circuit 71, for example, the neutral position.

Finally, a control signal is supplied from the control circuit 61 to the change-over switch 73 to close the switch at a-c, whereby AF servo re-draw-in is effected.

As can be seen from the foregoing description, in the present embodiment, the AF servo re-draw-in is effected with the objective lens held at the in-focus position or a desired position near it and therefore, accurate and quick AF servo draw-in becomes possible.

According to the present invention as described above, when there is abnormal tracking or abnormal focusing, change-over is immediately effected to the position servo and the movable portion of the optical system of the optical head is held at a prestored predetermined position, and then AT servo re-draw-in or AF servo re-draw-in can be effected and therefore, accurate and quick servo re-draw-in becomes possible.

The present invention permits various applications, besides the above-described embodiments. For example, the embodiments have been shown with respect to a case where the recording and reproduction of information are effected by the same apparatus, but the present invention is also applicable to an apparatus which effects only recording or reproduction. Further, the shape of the medium is not limited to the card-like shape shown in the embodiments, but may be any shape such as a disc-like shape or a tape-like shape. The present invention covers all of such applications without departing from the scope thereof as defined in the appended claims.

We claim:

1. An optical information processing apparatus comprising:
    an optical head having an optical system having an objective lens contained in a frame and effecting at least one of recording and reproduction of information by applying a light beam condensed by said optical system to a recording medium;
    means for detecting a tracking signal indicative of the positional deviation between the applied position of said light beam and a track provided on the recording medium;
    means for moving said objective lens so as to change the applied position of said light beam;
    tracking control means for controlling said objective lens moving means in accordance with said tracking signal so that said light beam is accurately applied onto a target track;
    means for detecting the position of said objective lens relative to said frame;
    position control means for controlling said objective lens moving means so that said objective lens is held in a predetermined position, on the basis of the output signal of said position detecting means;
    means for detecting a state in which there is a possibility of a deviation of said light beam from said target track; and
    switching means alternatively operating said tracking control means and said position control means, said switching means being effective to render said tracking control means inoperative and to operate said position control means when the deviation of said light beam from said target track is detected.

2. An optical information processing apparatus according to claim 1, wherein said tracking control means comprises a circuit for feeding back said tracking signal to said objective lens moving means.

3. An optical information processing apparatus according to claim 2, wherein said position control means comprises a circuit for storing therein a signal corresponding to the output of said position detecting means when said objective lens is in said predetermined position, a circuit for differentiating the stored signal and the output signal of said position detecting means, and a circuit for feeding back the output of said differentiating circuit to said objective lens moving means.

4. An optical information processing apparatus according to claim 3, further comprising means for comparing the output of said differentiating circuit with a predetermined value, and means for moving said optical head in the tracking direction when the output of said differentiating circuit is greater than said predetermined value.

5. An optical information processing apparatus according to claim 4, further comprising means for counting the amount of movement of said optical head.

6. An optical information processing apparatus according to claim 1, wherein said predetermined position is the position of said objective lens when the operation of said tracking control means has been started.

7. An optical information processing apparatus according to claim 1, wherein said position detecting means comprises a light-emitting element mounted on said frame, a reflecting member mounted on said moving means for reflecting the light emitted from said light-emitting element, and a light-receiving element mounted on said frame for detecting the light reflected by said reflecting member.

8. An optical information processing apparatus comprising:
    an optical head having an optical system having an objective lens contained in a frame and effecting at least one of recording and reproduction of information by applying a light beam condensed by said optical system to a recording medium;
    means for detecting a focusing signal indicative of the positional deviation in the direction of the optical axis between the focus position of said light beam and the surface of the recording medium;
    means for moving said objective lens so as to change the applied state of said light beam;
    focusing control means for controlling said objective lens moving means in accordance with said focusing signal so that said light beam is accurately focused to the surface of the recording medium;

means for detecting the position of said objective lens relative to said frame;

position control means for controlling said objective lens moving means so that said objective lens is held in a predetermined position, on the basis of the output signal of said position detecting means;

means for detecting a state in which there is a possibility of said light beam being out-of-focus from preciously being in an in-focus state; and switching means for alternatively operating said focusing control means and said position control means, said switching means being effective to render said focusing control means inoperative and to operate said position control means when the out-of-focus state of said light beam is detected.

9. An optical information processing apparatus according to claim 8, wherein said focusing control means comprises a circuit for feeding back said focusing signal to said objective lens moving means.

10. An optical information processing apparatus according to claim 9, wherein said position control means comprises a circuit for storing therein a signal corresponding to the output of said position detecting means when said objective lens is in said predetermined position, a circuit for differentiating the stored signal and the output signal of said position detecting means, and a circuit for feeding back the output of said differentiating circuit to said objective lens moving means.

11. An optical information processing apparatus according to claim 8, wherein said predetermined position is the position of said objective lens when the operation of said focusing control means has been strated.

12. An optical information processing apparatus according to claim 11, wherein said detecting means for detecting the out-of-focus state of said light beam outputs an abnormality detection signal when the difference between said predetermined position and the position of said objective lens detected by said position detecting means is outside a predetermined range.

* * * * *

UNITED STATES PATENT AND TRADEMARK OFFICE
CERTIFICATE OF CORRECTION

PATENT NO. : 4,982,394

DATED : January 1, 1991

INVENTOR(S) : Shigeto Kanda et al.

It is certified that error appears in the above-identified patent and that said Letters Patent is hereby corrected as shown below:

COVER PAGE

[54]:

"OPTICAL INFORMATION RECORDING/REPRODUCING APPARATUS" should read --OPTICAL STORAGE APPARATUS IN WHICH FOCUSSING AND TRACKING CONTROL ARE SELECTIVELY DISABLED--.

COLUMN 1:

Lines 1 and 2, "OPTICAL INFORMATION RECORDING/REPRODUCING APPARATUS" should read --OPTICAL STORAGE APPARATUS IN WHICH FOCUSSING AND TRACKING CONTROL ARE SELECTIVELY DISABLED--.

COLUMN 2:

Line 50, "takes" should read --take--.

COLUMN 4:

Line 65, "-11st-order" should read --1st order--.

COLUMN 5:

Line 11, "the" (second occurrence) should read --are--.
Line 17, "(field" should read --(filed--.
Line 34, "constitute" should read --constitutes--.

UNITED STATES PATENT AND TRADEMARK OFFICE
CERTIFICATE OF CORRECTION

PATENT NO. : 4,982,394

DATED : January 1, 1991

INVENTOR(S) : Shigeto Kanda et al.

It is certified that error appears in the above-identified patent and that said Letters Patent is hereby corrected as shown below:

COLUMN 7:

Line 49, "operates" should read --operate--.

COLUMN 10:

Line 7, "detecting" should read --detecting an abnormality in said tracking control;-- and "a state in which there is a possi-" should be deleted.

Line 8, delete the entire line.

Line 9, "target track;" should be deleted.

Line 14, "the" should read --the abnormality in said tracking control--; and "deviation of" should be deleted.

Line 15, "said light beam from said target track" should be deleted.

UNITED STATES PATENT AND TRADEMARK OFFICE
CERTIFICATE OF CORRECTION

PATENT NO. : 4,982,394

DATED : January 1, 1991

INVENTOR(S) : Shigeto Kanda et al.

It is certified that error appears in the above-identified patent and that said Letters Patent is hereby corrected as shown below:

COLUMN 11:

Line 7, "detecting" should read --detecting an abnormality in said focusing control; and--; and delete "a state in which there is a possi-"

Lines 8 and 9, delete both lines entirely.

Line 15, "the" should read --the abnormality in said focusing control--.

Line 16, "out-of-focus state of said light beam" should be deleted.

COLUMN 12:

Line 13, "strated." should read --started.--.

Signed and Sealed this

Eighth Day of December, 1992

Attest:

DOUGLAS B. COMER

*Attesting Officer*  *Acting Commissioner of Patents and Trademarks*